(12) United States Patent
Thomas

(10) Patent No.: US 11,707,073 B2
(45) Date of Patent: Jul. 25, 2023

(54) APPLIANCE FOR MAKING ICE CREAM

(71) Applicant: BREVILLE PTY LIMITED, Alexandria (AU)

(72) Inventor: Mark Thomas, Leichhardt (AU)

(73) Assignee: BREVILLE PTY LIMITED, Alexandria (AU)

(*) Notice: Subject to any disclaimer, the term of this patent is extended or adjusted under 35 U.S.C. 154(b) by 242 days.

(21) Appl. No.: 17/075,674

(22) Filed: Oct. 20, 2020

(65) Prior Publication Data

US 2021/0030019 A1 Feb. 4, 2021

Related U.S. Application Data

(63) Continuation of application No. 15/039,418, filed as application No. PCT/AU2014/001080 on Nov. 27, 2014, now abandoned.

(30) Foreign Application Priority Data

Nov. 29, 2013 (AU) .................................. 2013904627
Dec. 5, 2013 (AU) .................................. 2013904731

(51) Int. Cl.
*A23G 9/12* (2006.01)
*B01F 27/091* (2022.01)
(Continued)

(52) U.S. Cl.
CPC ............ *A23G 9/12* (2013.01); *B01F 27/0723* (2022.01); *B01F 27/0724* (2022.01);
(Continued)

(58) Field of Classification Search
CPC ....... A23G 9/12; A23G 9/22; B01F 15/00779; B01F 7/0025; B01F 15/0048;
(Continued)

(56) References Cited

U.S. PATENT DOCUMENTS 3,176,968 A    4/1965 Appleton
3,258,147 A *  6/1966 Rownd .................. A47J 41/02
                                                  215/12.1
(Continued)

FOREIGN PATENT DOCUMENTS

CN    102008117 A    4/2011
DE    39 21 115 A1   1/1991
(Continued)

OTHER PUBLICATIONS

Extended European Search Report for EP Patent Application No. 14865669.7, dated Jun. 23, 2017.
(Continued)

*Primary Examiner* — Charles Cooley
(74) *Attorney, Agent, or Firm* — Patterson + Sheridan, LLP

(57) ABSTRACT

A bowl assembly for a base driven appliance, the base driven appliance providing a primary drive coupling for the accessory assembly. The accessory assembly including: a bowl element that defines a reservoir; and a gear-box element having a secondary drive coupling and a secondary driven coupling. The bowl element defines a lower recess that removably receives the gear-box element, such that the primary drive coupling can engage the secondary driven coupling when the bowl assembly is supported by the base driven appliance. The secondary driven coupling is couplable to an accessory element that is operated within the reservoir, and such that the accessory element is operable by rotation of the primary drive coupling.

9 Claims, 12 Drawing Sheets

(51) Int. Cl.
  *B01F 27/112* (2022.01)
  *B01F 27/213* (2022.01)
  *B01F 27/072* (2022.01)
  *B01F 27/808* (2022.01)
  *B01F 35/31* (2022.01)
  *B01F 35/45* (2022.01)
  *B01F 35/50* (2022.01)
  *B01F 35/92* (2022.01)
  *B01F 35/32* (2022.01)
  *B01F 35/90* (2022.01)
  *B01F 101/13* (2022.01)

(52) U.S. Cl.
  CPC .......... *B01F 27/091* (2022.01); *B01F 27/112* (2022.01); *B01F 27/213* (2022.01); *B01F 27/808* (2022.01); *B01F 35/31* (2022.01); *B01F 35/3204* (2022.01); *B01F 35/45* (2022.01); *B01F 35/54* (2022.01); *B01F 35/92* (2022.01); *B01F 2035/98* (2022.01); *B01F 2101/13* (2022.01)

(58) Field of Classification Search
  CPC ............ B01F 15/00538; B01F 7/00208; B01F 7/00725; B01F 15/065; B01F 15/00909; B01F 7/162; B01F 7/00141; B01F 7/00133; B01F 2215/00649; B01F 2215/0021; B01F 2015/061; B01F 27/0723; B01F 27/0724; B01F 27/091; B01F 27/112; B01F 27/213; B01F 27/808; B01F 35/31; B01F 35/3204; B01F 35/45; B01F 35/54; B01F 35/92; B01F 2035/98; B01F 2101/13; A47J 43/046
  USPC ....................................................... 366/149
  See application file for complete search history.

(56) References Cited

U.S. PATENT DOCUMENTS

| | | | |
|---|---|---|---|
| 3,952,538 A * | 4/1976 | Warlick | A23G 9/106 366/144 |
| 4,450,692 A | 5/1984 | Sharpe et al. | |
| 4,545,216 A | 10/1985 | Cavalli | |
| 4,551,026 A | 11/1985 | Cristante | |
| 4,583,863 A * | 4/1986 | Pandolfi | A23G 9/12 366/314 |
| 4,655,605 A | 4/1987 | Cipelletti | |
| 4,736,600 A | 4/1988 | Brown | |
| 4,838,702 A | 6/1989 | Torimitsu et al. | |
| 4,885,917 A | 12/1989 | Spector | |
| 4,891,966 A * | 1/1990 | Kramer | G01N 7/14 73/19.01 |
| 6,213,007 B1 | 4/2001 | Lande | |
| 7,878,021 B2 | 2/2011 | Perrier et al. | |
| 8,425,108 B2 | 4/2013 | Fung | |
| 9,016,926 B2 | 4/2015 | Cocchi et al. | |
| 2003/0131736 A1 | 7/2003 | Wanat | |
| 2012/0092953 A1 | 4/2012 | Fung | |
| 2017/0042179 A1 | 2/2017 | Thomas | |
| 2021/0030019 A1 * | 2/2021 | Thomas | B01F 35/92 |

FOREIGN PATENT DOCUMENTS

| | | |
|---|---|---|
| DE | 3921115 A1 * | 1/1991 |
| EP | 3 369 353 A1 | 9/2018 |
| GB | 2153514 A | 8/1985 |
| GB | 2473342 A | 3/2011 |
| WO | WO-2019/167098 A1 | 9/2019 |
| WO | WO-2019167098 A1 * | 9/2019 |

OTHER PUBLICATIONS

International Search Report and Written Opinion for PCT/AU2014/001080, dated Feb. 11, 2015.
International Preliminary Report on Patentability for PCT/AU2014/001080, dated May 31, 2016.
Office Action for Australian Patent Application No. 2014354568, dated Sep. 17, 2017.
Office Action issued in Chinese Patent Application No. 201480073847.0, dated Mar. 20, 2019.

* cited by examiner

APPLIANCE FOR MAKING ICE CREAM

FIELD OF THE INVENTION

The present invention relates to food appliances and in particular to appliances for making ice cream.

The invention has been developed primarily as an ice cream making attachment for a base driven appliance, and will, be described hereinafter with reference to this application.

However, it will be appreciated that the invention is not limited to this particular field of use.

BACKGROUND OF THE INVENTION

Any discussion of the prior art throughout the specification should in no way be considered as an admission that such prior art is widely known, or forms part of the common general knowledge in the field.

Known devices for making ice cream are either typically single purpose appliances or an accessory freezer bowl for a planetary mixer appliance. Both single purpose ice cream making appliances and planetary mixer appliances are relatively specialized appliances in the kitchen. Further, planetary mixer appliances mix ingredients in a bowl using a mixer/paddle driven from above the bowl.

Accordingly, there is a need in the art to provide alternative base driven devices or an alternative for base driven appliances.

SUMMARY OF THE INVENTION

According to an aspect of the invention there is provided an embodiment, to overcome or ameliorate at least one of the disadvantages of the prior art, or to provide a useful alternative.

According to an aspect of the invention there is provided an embodiment that provides attachments for a base driven appliance.

According to an aspect of the invention there is provided a bowl, assembly for a base driven appliance, the base driven appliance providing a primary drive coupling for the accessory assembly, the accessory assembly including:
a bowl element that defines a reservoir;
a gearbox element having a secondary drive coupling and a secondary driven coupling; wherein the bowl element defines a lower recess that removably receives the gearbox element, such that the primary drive coupling can engage the secondary driven coupling when the bowl assembly is supported by the base driven appliance; and wherein the secondary driven, coupling is couplable to an accessory element that is operated within the-reservoir, and such that the accessory element is operable by rotation of the primary drive coupling.

The bowl element may have a central sleeve that defines the lower recess. The sleeve may comprise a central raised sleeve that former defines a substantially annular reservoir region within the bowl element. The lower recess may be centrally located with respect to the reservoir.

The gearbox element may have a body that is sized to fit within the lower recess, with the secondary driven coupling being accessible from beneath the bowl assemble, and with the secondary drive coupling accessible from above the bowl assembly. The gearbox element may releasably engage to the bowl element A bayonet coupling may releasably engage the gearbox element to the bowl element. The gearbox element may include a planetary gearbox. The gearbox may include a clutch element.

The bowl assembly may releasably engage the base driven appliance. A bayonet coupling may releasably engage the bowl assembly to the base driven appliance.

The gearbox element may form a seal against an inner surface of the lower recess to restrict ingress through an upper aperture in communication with the lower recess.

The accessory element, may have a shaft that engages and is drivers by the secondary drive coupling.

The bowl assembly may further include an interlock assembly that cooperates with a lid for the reservoir, wherein the lid is in a fastened position engages the interlock element allowing a controller to actuate a motor to drive the primary driven coupling. The interlock assembly may cooperate with a lid for the reservoir, wherein the interlock element prohibits the primary driven coupling from being driven when the lid is not engaged.

The bowl element may be a freezer bowl, and a paddle within, the freezer bowl is driven to rotate by the base driven appliance, wherein a secondary driven coupling element engages the primary drive coupling element for driving rotation of the paddle within the bowl. The freezer bowl may be a dual wall freezer bowl.

A. paddle accessory item may have two oppositely radially-directed arms or paddles portions of difference sizes and configuration. A larger paddle portion may form a scraper paddle that rotates within the freezer bowl for scraping the sidewalls of the freezer bowl, and wherein the scraper paddle substantially conforms with and abuts the inner surface of the fluid reservoir. A smaller paddle portion may form a stirrer paddle that rotates within the freezer bowl for stirring the ingredients.

According to an. aspect of the invention there is provided an ice cream, accessory assembly for a base driven appliance, the ice cream making assembly being supported by the base; the assembly including:
a freezer bowl for cooling foods therein;
a paddle within the freezer bowl, which is driven to rotate by the base;
a lower drive coupling element that engages a base drive coupling element for driving rotation of the paddle within the bowl.

Preferably, the freezer bowl is a dual wall freezer bowl.

Preferably the freezer bowl has a central sleeve that, defines an annular reservoir region within the bowl.

Preferably, the freezer bowl includes a secondary drive coupling element for engaging the paddle and. driving rotation of the paddle within the bowl.

Preferably, the freezer bowl has a central sleeve that defines a lower recess for receiving a gear assemble. More preferably, the gear assemble comprises the driven gear coupling element and a secondary drive coupling element. More preferably, the gear assembly reduces rotational drive speed and/or improves rotational torque.

Preferably the paddle has a central shaft/coupling that can engage (and be driven by) a secondary drive coupling.

Preferably the paddle has two oppositely radially-directed arms or paddles portions of difference sizes and configuration. A larger arm or paddle portion is preferably a scraper paddle that rotates within the freezer bowl for scraping the sidewalk of the freezer bowl. The smaller arm or paddle portion, is preferably a stirrer paddle that rotates within the freezer bowl for stirring the ingredients. More preferably, the scraper paddle substantially conforms with and abuts the inner surface of the fluid reservoir.

Preferably, a lid can be placed over and/or retained by the freeze bowl. More preferably, the lid includes a central hub that receives a central spindle of the paddle, for centrally locating the paddle within the freezer bowl.

BRIEF DESCRIPTION OF THE DRAWINGS

A preferred embodiment of the invention will now be described, by way of example only, with reference to the accompanying drawings in which.

DETAILED DESCRIPTION

Figure 1:
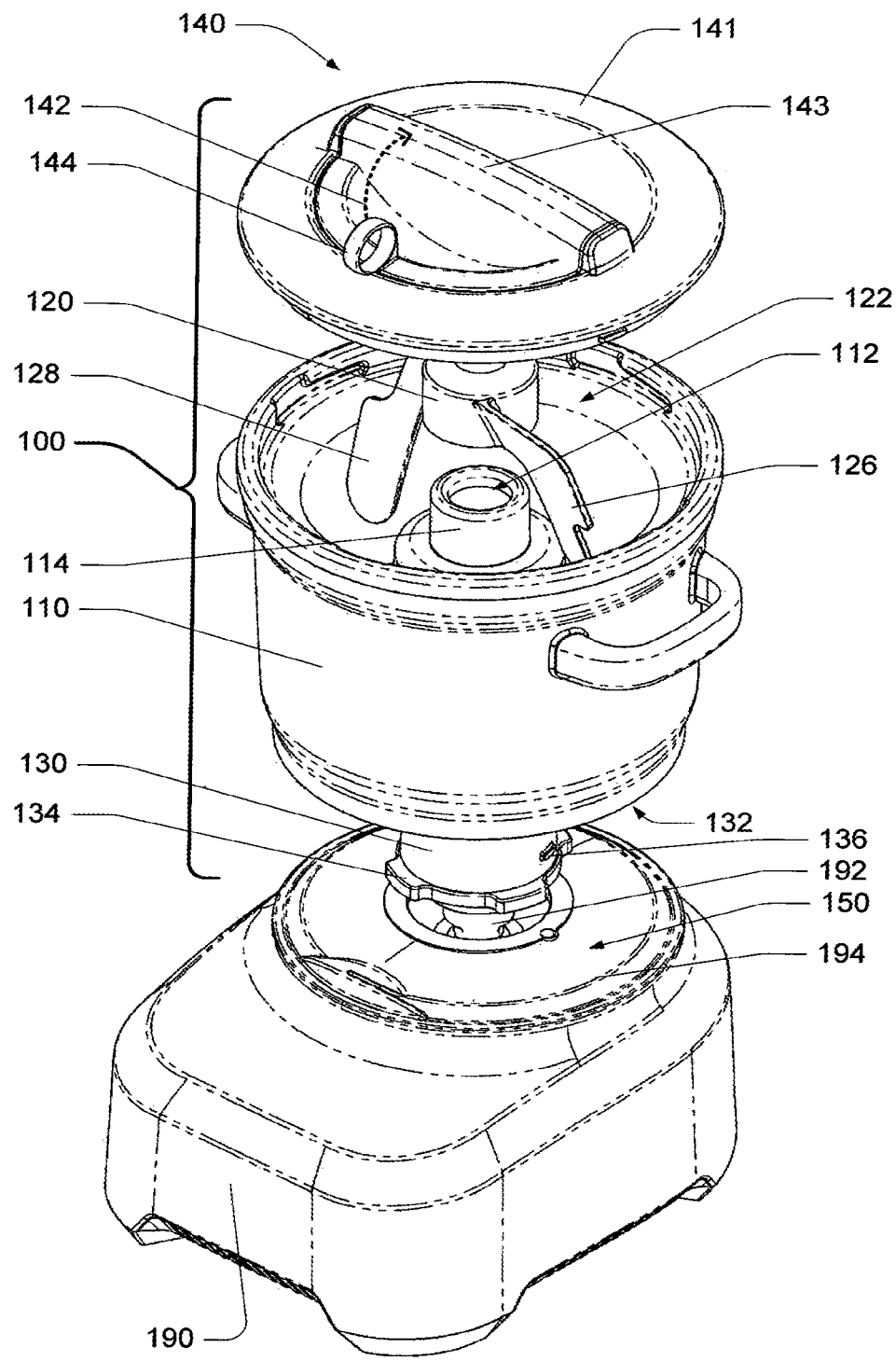
FIG. 1 is an exploded view of an embodiment ice cream accessory assembly for a base driven appliance.

Referring to the drawings, there is disclosed an ice cream making attachment (or assembly) for a base driven appliance. The ice cream making assembly, includes freezer bowl for cooling foods therein, and a rotating or circulating paddle for moving/scraping the food Hems therein as they cool. Typically, (the food items are initially liquid/fluid food items.

It will be appreciated that, to improve efficiency, the freezer howl can be. a dual wall, freezer bowl.

The ice cream making assembly is supported by and/or cooperates with a base that couples through a howl (or floor of the bowl) to drive rotation or circulation, of the paddle. A centrally located aperture within the howl allows a circulating paddle to be driven by a power source located below the freezer bowl in the base.

As many base driven kitchen appliances are relatively high speed appliances, a gear assembly (for example a gearbox) arrangement can be used reduce rotational drive speed and/or improve rotational torque.

By way of example only, an ice cream making attachment, may include (or co-operate with) any one or more of the following:

Externally Geared Arrangement: One intention of the design is the provision of a gearing mechanism to be provided for motor drive bases operating at a higher than desired speeds of rotation for the freezer bowl paddle to operate effectively. A geared arrangement allows the bowl assembly to be used on products normally suited for higher speed applications, for example, a food processor (for example, using an induction motor).

Internally Geared Arrangement: In another embodiment, a motor base could be provided with the desired gear assembly fitted within the motor enclosure. With the gear assembly integrated into the powerbase there would no longer be a requirement for large internal clearances within the bowl, form that would otherwise accommodate an externally mounted gear assembly. This would benefit greater bowl volumes. A typical power source would include a Universal Motor or DC Motor in communication with a gear assembly (for example, using a universal motor).

In an alternative embodiment, an ice cream making attachment may not require (or include) a gear arrangement. By way of example, the base may be modified or adapted to have a motor that cam operate within a wider rotational speed band without the requirement of gearing. One such example may include a switched reluctance motor (SRM) that typically enables a low speed range and operating torque suited, to the application of ice cream making.

FIG. 1 shows is an embodiment ice cream accessory assembly 100 for a base driven appliance 190. The ice cream making assembly is supported by and/or cooperates with the base.

In this example embodiment, the ice cream making assembly 100, includes a dual wall freezer bowl 110 for cooling foods therein. A paddle 120 is driven to rotate with the freezer bowl 110 by the base.

In this embodiment, by way of example only, the base includes an upper drive coupling 192. A gear assembly 130 (for example a gearbox) is engaged to the base drive coupling 192 to provide a secondary drive coupling. 132 of reduced rotational drive speed and or improve rotational torque. The gear assembly 130 can be located beneath freezer bowl or within a recess 112 defined about the base of the freezer bowl.

The paddle 120 has a central shaft/coupling 122 that. can engage (and be driven by) the secondary drive coupling 132. When assembled, rotation of a base motor (not shown) causes rotation of the base coupling 192, that drives rotation of the geared secondary coupling 132. that in turn drives rotation of the paddle. To assist with maintaining suitable couplings between the base, gears assembly and freezer bowl—the assembly may include a mounting bracket/element 150 for maintaining the bowl and base in. coupling engagement, and a gear locating element 134 that engages the freezer bowl for locating the gear assembly 130 with respect to the base 190, and resisting rotation there between. To assist with maintaining suitable drive coupling for the paddle, a lid 140 can be placed over and/or retained by the freezer bowl which then assists in locating the paddle within the freezer bowl. In an embodiment, the lid 140 has an outer portion 141 and in inner portion 142 that enable respective rotation there-between to present an opening for insertion of ingredients into the bowl recess 112. In this example a pivotable inner lid 142 can be pivoted or raised to allows a user to add ingredients during mixing. The inner lid can, by way of example only, pivot along a central axis defined by a central handle 143 located diametrically across the lid. Pivot mounts can be located at each end of the handle (for example, as shown in FIG. 3 as elements 370, 372), A lifting ring 144, can be used to raise the inner lid-portion 142, which can pivot about an axis defined by the central handle 143.

Figure 3:
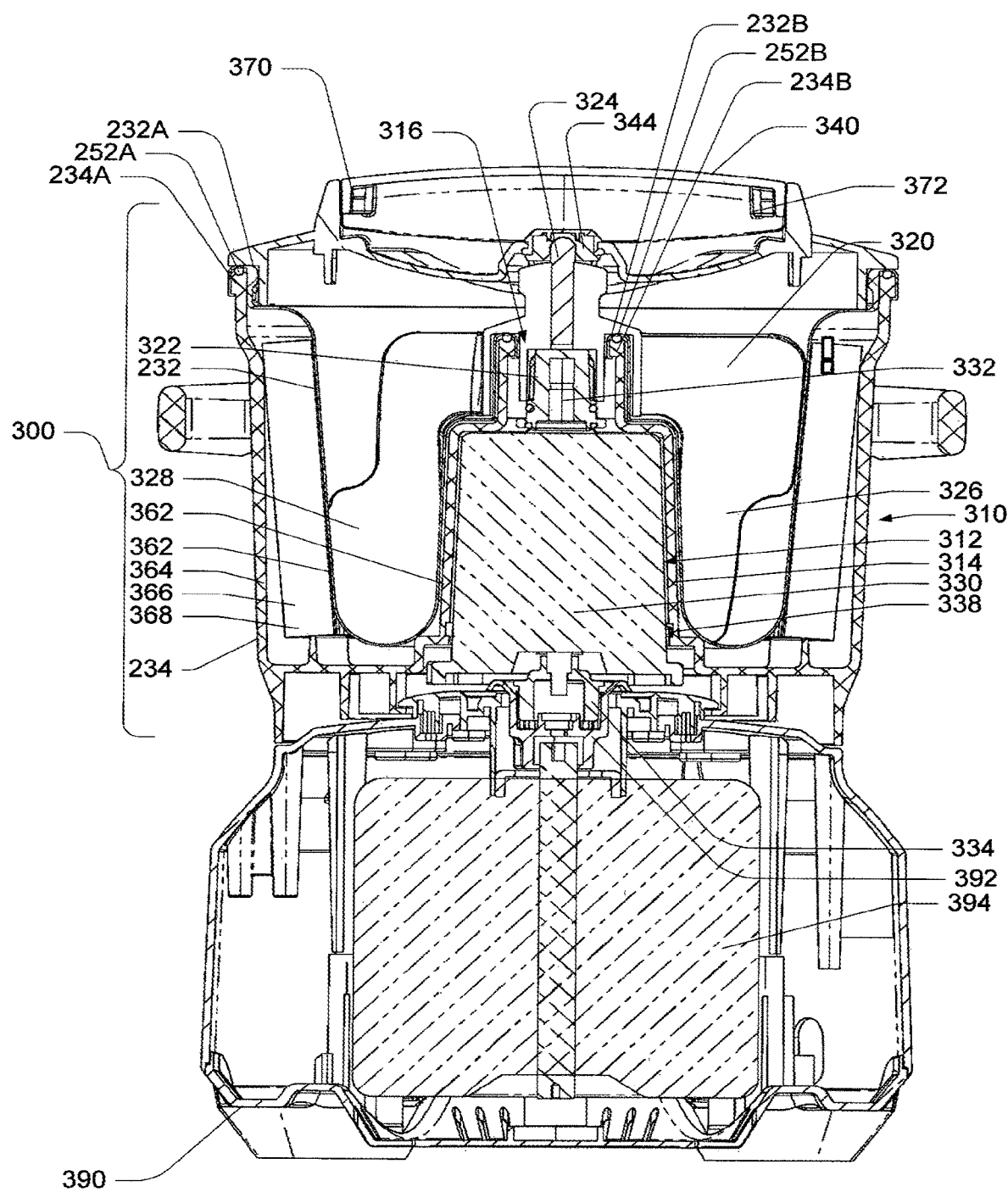
FIG. 3 is a sectional view of an embodiment ice cream accessory assembly for a base driven induction motor appliance.

In this example embodiment, that lid includes a central hub that, receives a central spindle (for example as shown in FIG. 3) of the paddle 120, for centrally locating the paddle within the freezer bowl. The paddle 120 may have one or more arms (126, 128) that rotate within the freezer bowl, for scraping the sidewalk of the freezer bowl. The paddle arms moving scraping the food items therein as they cool. Typically, the food items are initially liquid/fluid food items.

By way of example, to seal the freezer bowl, a central sleeve 114 defines the recess 112 and centrally located aperture for receiving the paddle shaft/coupling 122. In this embodiment, the freezer bowl defines an annular region for receiving the ice cream fluid moisture—and. making ice cream therein.

In an embodiment, the gear assembly 130 can, by way of example, be assembled or inserted into the freezer bowl inner opening 112 so that the entire bowl assembly can be removed from the power base with the gear drive still in position within the bowl. The gear assembly 130 can. be retained by a bayonet coupling (for example including locking tab 136).

Figure 2:
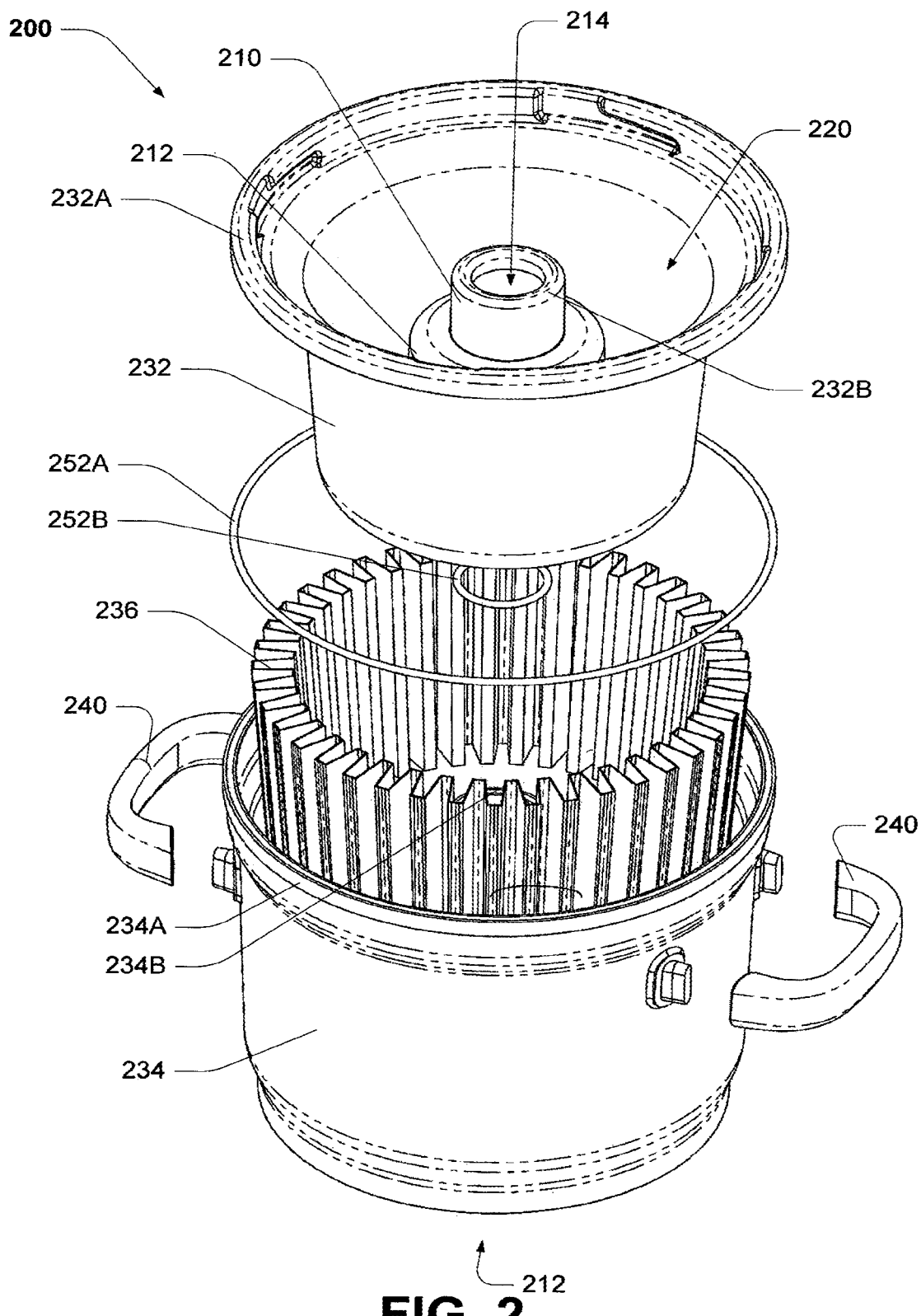
FIG. 2. is art exploded view of an. embodiment dual wall freezer bowl.

In an embodiment, the freezer bowl assembly 110 can be retained by the power base via bayonet coupling. A first portion of the bayonet coupling can, for example, be integral to the freezer bowl moulding and cooperate with receiving details in the power base (for example 194). It will be appreciated that similar bayonet couplings are used to couple a processing bowl with a food processor base. FIG. 2. shows an exploded view of an embodiment dual, wall freezer bowl 200.

By way of example, the freezer bowl defines a central, sleeve 210 defines the recess 212 for receiving a gearing assembly, and centrally located aperture 214 for receiving a paddle shaft/coupling. In this embodiment, the freezer bowl defines an annular region 220 for receiving the ice cream fluid mixture—and making ice cream therein.

This embodiment dual wall freezer bowl 200, includes an inner-surface formation, and an outer surface formation. The inner-surface formation defining the annular region for receiving the ice cream mixture. A heat sink 236 is located between the inner and outer formulations. It will be appreciated that the heat sink can be active or passive. Typically the inner and outer surfaces are bonded around the heat sink to restrict fluid ingress to the intermediate void region.

One or more handles 240 may be fixed to the freezer bowl for carrying. It will be appreciated that the present diametrically located, and in this example horizontally orientated, handles assist a user when lifting a freezer bowl 200.

In this embodiment, the freezer bowl 200 includes o-rings 252A, 252B for sealing the joint between the inner-surface formation and an outer surface formation. The o-rings are used to seal the void between inner-surface formation and the outer surface formation for retaining the heatsink and/or fluid gel. By way of example, o-rings are captured between freezer bowl moulding 234 and inner pressed portion 232.

In this embodiment, the outer freezer bowl moulding 234 has a raised outer perimeter 234A and a raised inner aperture 234B that defines the recess 212. The inner pressed portion 232 further has a raised outer perimeter 232A and a raised inner aperture 232B, which defines the annular region 220. The larger o-rings 252A is located between the raised outer perimeters 232A and 234A. The smaller o-rings 252B is located between the raised outer apertures 232B and 234B. It would be appreciated, a bonding agent such as a room temperature vulcanizing silicone could also be used, as an alternative to using an o-ring.

Figure 4:
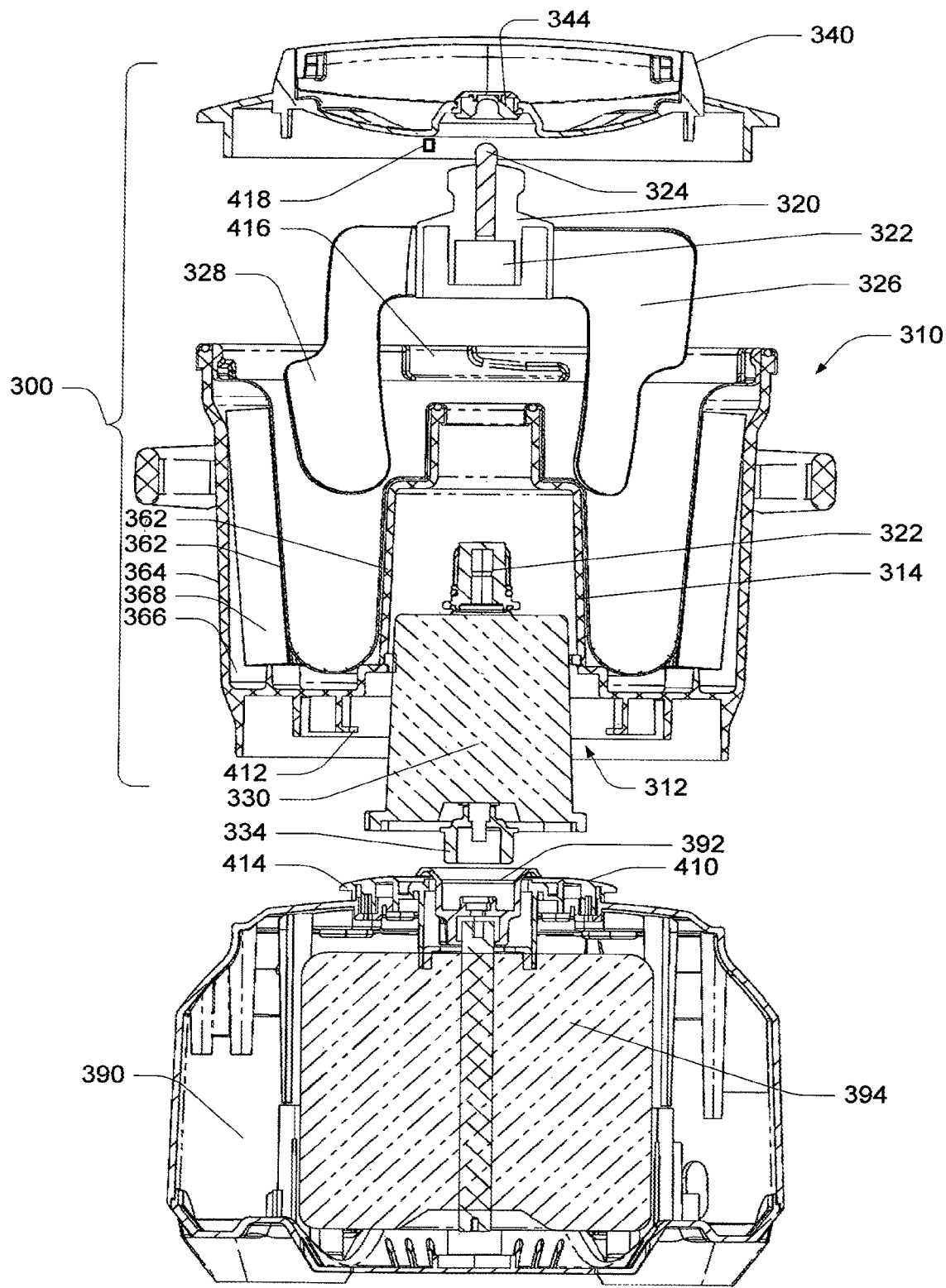
FIG. 4 is an exploded view of the assembly of FIG. 3.

FIG. 3 and FIG. 4 show an embodiment ice cream accessory assembly 300 for a base driven induction motor appliance 390. The ice cream making assembly is supported by and/or cooperates with the base.

In this example embodiment, the ice cream making assembly 300, includes a dual wall freezer bowl 310 for cooling foods therein. A paddle 320 is driven to rotate within the-freezer bowl 310 by the base. The paddle may former include a clutch assembly for restricting torque applied between the paddle and drive motor or gearbox. It will be appreciated that the clutch release torque would be greater than that required for hardest consistency of ice-cream to be made.

In this embodiment, by way of example only, the base includes an upper drive coupling 392 driven, by a motor 394 (for example an induction motor). A gear assembly 330 (for example s a gearbox such as a planetary gearbox) is engaged to the base drive coupling 392 to provide a secondary drive coupling 332 (typically having a reduce rotational drive speed and/or improve rotational torque), The gear assembly 330 can be located beneath freezer bowl or within a recess 312 defined about the base of the freezer bowl.

The paddle 320 has a central shaft/coupling 322 that can engage (and be driven, by) the secondary drive coupling 332. When assembled, rotation, of a base motor 394 causes rotation of the base coupling 392, that drives rotation of the geared secondary coupling 332, that in turn drives rotation of the paddle.

In an example embodiment, to assist with maintaining suitable couplings between the base, gears assembly and freezer bowl—the assembly may include a mounting bracket/element s (for example, feature 410 of FIG. 4) for maintaining the bowl and base in coupling engagement (for example, through engagement of features 412 and 414 of FIG. 4): and/or a gear locating element 338 that engages the freezer bowl, for retaining the gear assemble with respect to the freezer bowl, and resisting rotation there between.

To assist with maintaining suitable drive coupling for the paddle, a lid 340 can be placed over and/or retained by the freezer bowl, which then assists in locating the paddle within the freezer bowl, in this example, that lid includes a central hub 344 that receives a central spindle 324 of paddle 320, for centrally locating the paddle within the freezer bowl The paddle 320 has one or more arms (326, 328)—typically of difference sizes and/or configuration—that rotate within the freezer bowl for scraping the sidewalls of the freezer bowl. The paddle arms moving/scraping the food items therein as they cool. Typically, the food items are initially liquid/fluid food items.

By way of example, to seal the freezer bowl, a central sleeve 314 defines the recess 312 and a centrally located aperture 316 for receiving the paddle shaft/coupling 322. In this embodiment, the freezer bowl defines an. annular region for receiving the ice cream fluid 0 moisture—and making ice cream therein. It would be appreciated that the-upwardly projecting sleeve can extend past the fill height of the ice cream, fluid moisture, thereby defining the annular region between the sleeve and the outer wall. The height of the sleeve and outer wall can remove the need for sealing the paddle coupling.

In an embodiment the freezer bowl can have an inner-surface formation 362, and an outer surface formation 364, between which is sandwiched a coolant gel 366. A heat sink 368 can also be is sandwiched between the inner-surface' formation 362. and the outer surface formation 364.

By way of example only, the gear assembly 330 comprises a planetary gear system that connects the driven coupling 334 to the secondary drive coupling 332. The gear driven coupling 334 being engaged to the base drive coupling 392.

It will be appreciated that the paddle arms (326, 328) are shaped to scrape the walls of the freezer bowl recess 312. Each paddle arm. can. be shaped such that, the annular recess is not blocked—typically provided by a cut out (or recessed) portion of each arm. Each paddle arm can be shaped such that portions of the walls of the freezer bowl recess 312 not scraped by one arm is scraped by the other.

FIG. 4 further shows: the bowl 100 can be mounted to a bracket 410 on the base 390, the bowl having a bayonet coupling element 412 that cooperates with a receiving face 414 on the base bracket 410 for releasably retaining the bowl to the base; and the bowl having a bayonet coupling element 416 that cooperates with a lid bayonet coupling element 418 for releasably retaining the lid on the bowl.

In this embodiment, it will be appreciated that the paddle 320 has two oppositely radially-directed arms or paddles (326, 328) of difference sizes and configuration. The larger arm or paddle 326 (scraper paddle) that rotate within the freezer bowl for scraping the sidewalk of the freezer bowl. The smaller arm or paddle 328 (stirrer paddle) rotates within the freezer bowl for stirring the ingredients. The annular recess and scraper paddle substantially conform in cross section to enable most of the inner surface of the recess to be scraped during rotation of the paddle.

In an embodiment, the paddle can be integrally formed as a single piece paddle. Alternatively, a scraper paddle can include an overmouled elastomeric edge. This overmouled elastomeric edge can provide better scraping and create a thinner layer of ice cream on the bowl wall, which in turn takes less time to cool, reducing the overall cooling period.

Figure 5:
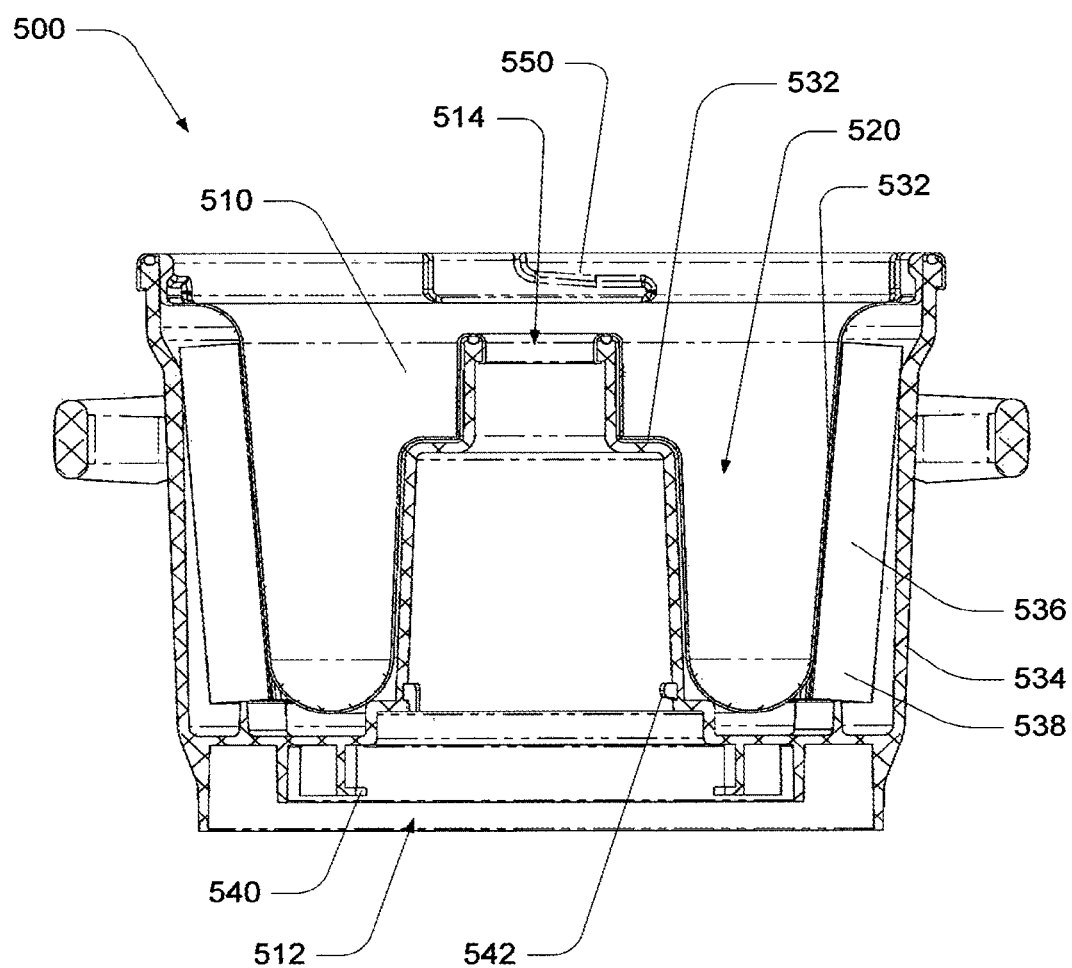
FIG. 5 is a sectional view of the-freezer bowl of FIG. 3.

FIG. 5 shows an embodiment dual wall freezer bowl 500.

By way of example, the freezer bowl 500 has a central sleeve 510 that defines a recess 512 for receiving a gearing assembly, and centrally located aperture 514 for receiving a paddle shaft coupling. In this embodiment, the freezer bowl defines an annular region 520 for receiving the ice cream fluid mixture—and making ice cream therein.

This embodiment dual wall freezer bowl 500, includes an inner-surface formation 532, and an outer surface formation 534. The inner-surface formation defining the annular region for receiving the ice cream mixture. A. heat sink 536 and or coolant gel 538 is located between the inner and outer formulations. It will be appreciated that the heat sink can be active or passive. Typically, the inner and outer surfaces are bonded around the heat sink and or coolant gel to restrict fluid ingress to the intermediate void region.

The inner-surface formation 532 can be a seamless surface that is wrapped over the upper edge of the outer wall and the sleeve. The inner-surface formation 532, and the outer surface formation 534 can be bonded to seal the intermediate void region.

In this example embodiment, the bowl 500 has a base bayonet coupling element 540 that cooperates with a receiving face on. a base for releasably retaining the bowl to the base; and gear bayonet coupling element 542 that cooperates with a gear assembly for releasably retaining the gear assembly within the recess 512.

It will be appreciated that the inner cover 532 can. be formed of one or more components comprised of plastics or metals (for example aluminum).

In an alternative embodiment dual wail freezer bowl, the inner cover is fabricated from at least two portions—typically about the central sleeve portion. For example, a pressed inner liner can be formed from aluminum, assembled by one or more deep drawn, pressed or spun portions.

It will be appreciated that a lid (not shown) can be releasably coupled to the bowl assembly (for example feature 500) using a bayonet coupling.

It will be further appreciated that a bayonet coupling can comprise an interconnect mating design that typically uses: a pin (or protrusion) that is received by an inclined recess or surface (for example feature 550); or an inclined protrusion that is received by a recess or surface. Relative movement between the pin (or protrusion) and recess causes the two elements to be drawn together due to the inclined surface.

Figure 6A:
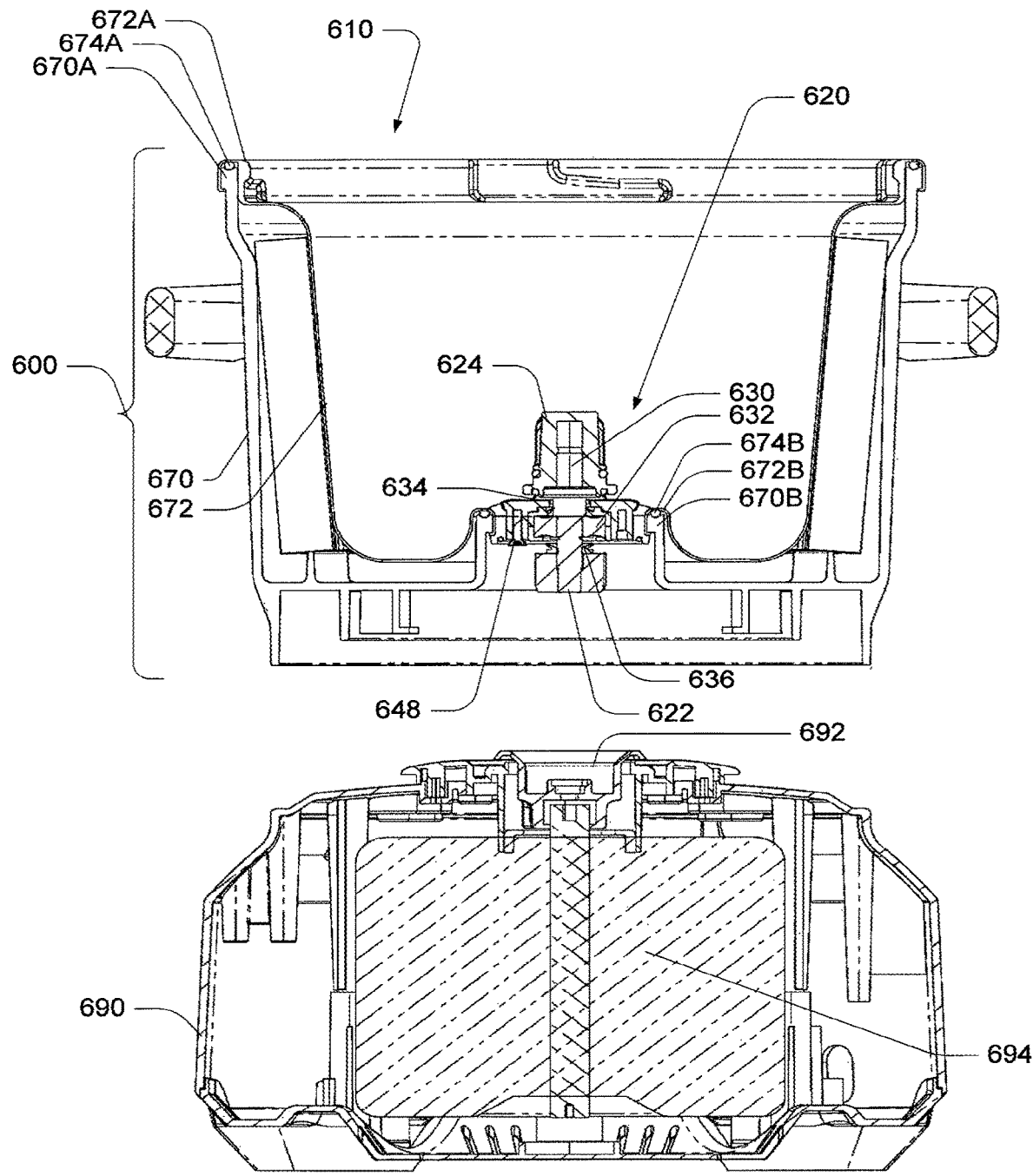
FIG. 6A is a sectional view of an embodiment ice cream accessory assembly for a base driven switched reluctance appliance.

FIG. 6A shows an embodiment ice cream accessory assembly 600 for a base driven switch reluctance motor appliance 690. The ice cream making assembly is supported by and/or cooperates with the base.

In this example embodiment, the ice cream making assembly 600, includes a dual wall freezer bowl 610 for cooling foods therein. A paddle (not shown) is driven to rotate within the freezer bowl 610 by the base.

The appliance 690 has a primary drive coupling 692 driven, by a switch reluctance motor 694.

As the present application does not include a gear assembly, it is not necessary to provide a respective central recess in the bowl configuration. Accordingly, the bowl includes a central coupling assembly 620 comprising a driven coupling element 622 and a secondary drive-coupling element 624. The driven coupling element 622 engages the primary drive coupling 692 to then drive rotation of the secondary drive coupling element 624—thereby transferring rotational torque to the paddle. However, as the ice-cream making fluid in the bowl will now be enabled to cover the secondary drive coupling (for driving the paddle), the coupling must be fluid sealed with respect to the bowl. It will be appreciated that this can be achieved, by way of example only, using techniques similar to those known in the art. for blender coupling.

In this example, a central shaft 630 is supported by one or more bearings 632 and sealed with an upper seal 634 and lower seal 636. The driven coupling element 622 and the secondary drive coupling element 624 are fixed to respective ends of the shaft 630.

Figure 6B:
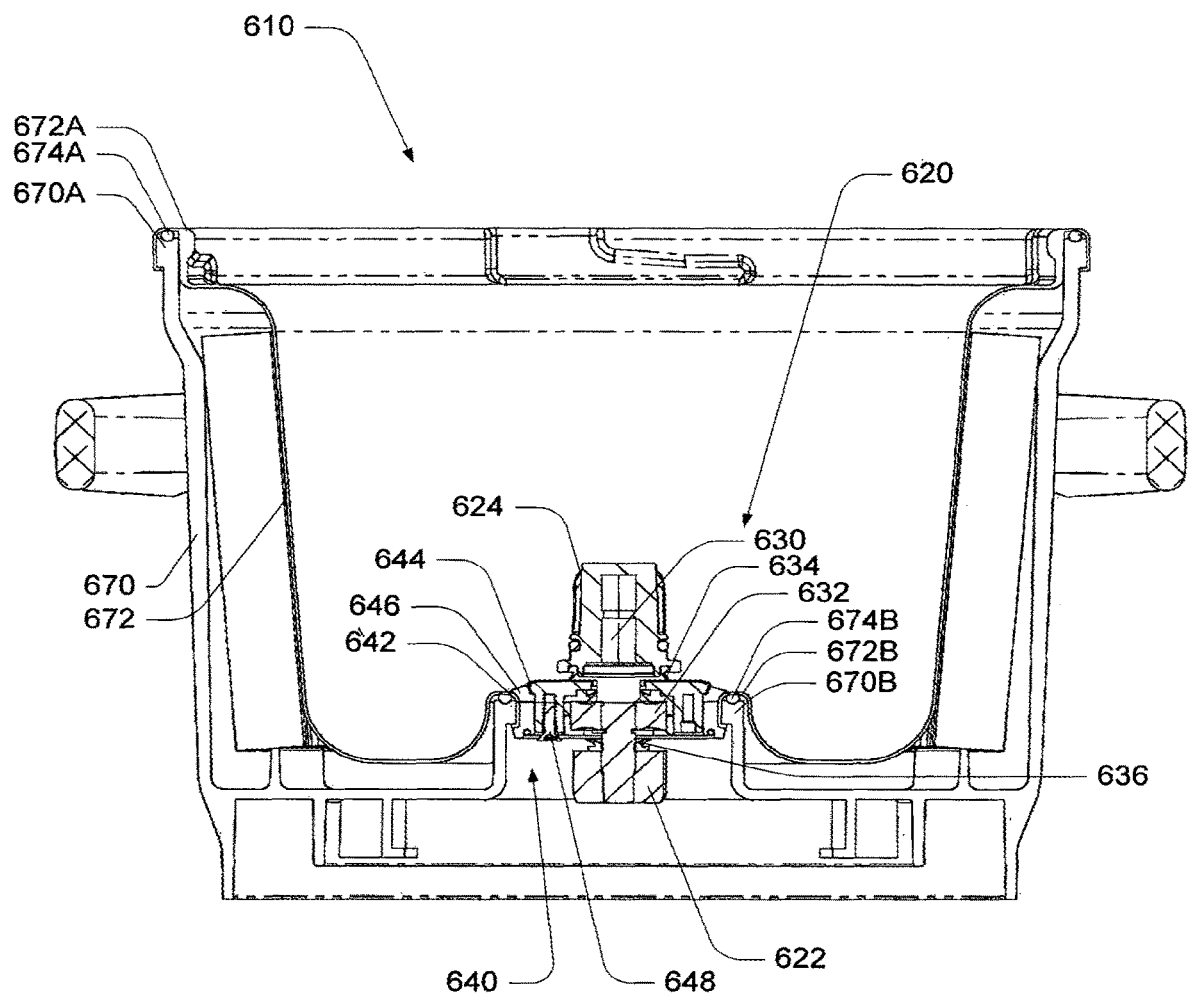
FIG. 6B is a sectional view of an embodiment freezer bowl for use with a switched reluctance motor (SRM) motor application.

As best shown in FIG. 6B, the bowl defines a central aperture 640 for receiving the central coupling assembly 620. The aperture 640 has a circumferential chamfered surface 642 for sealing engagement with, a corresponding abutment surface 644 of the central coupling assembly 620. A seal element 646 can be interpose between these surfaces.

It will be appreciated that, an inner-surface formation, an outer surface formation, heat sink and coolant gel can be constructed according to any one or more of the examples disclosed herein.

By way of example, the central coupling assembly 620 has a clamed engagement about the aperture 640. The abutment surface 644 is brought into sealing engagement, for example with, an intermediate seal element 646, by a screw fixing 648 retaining an upper and lower portion of the central coupling assembly 620.

Figure 6C:
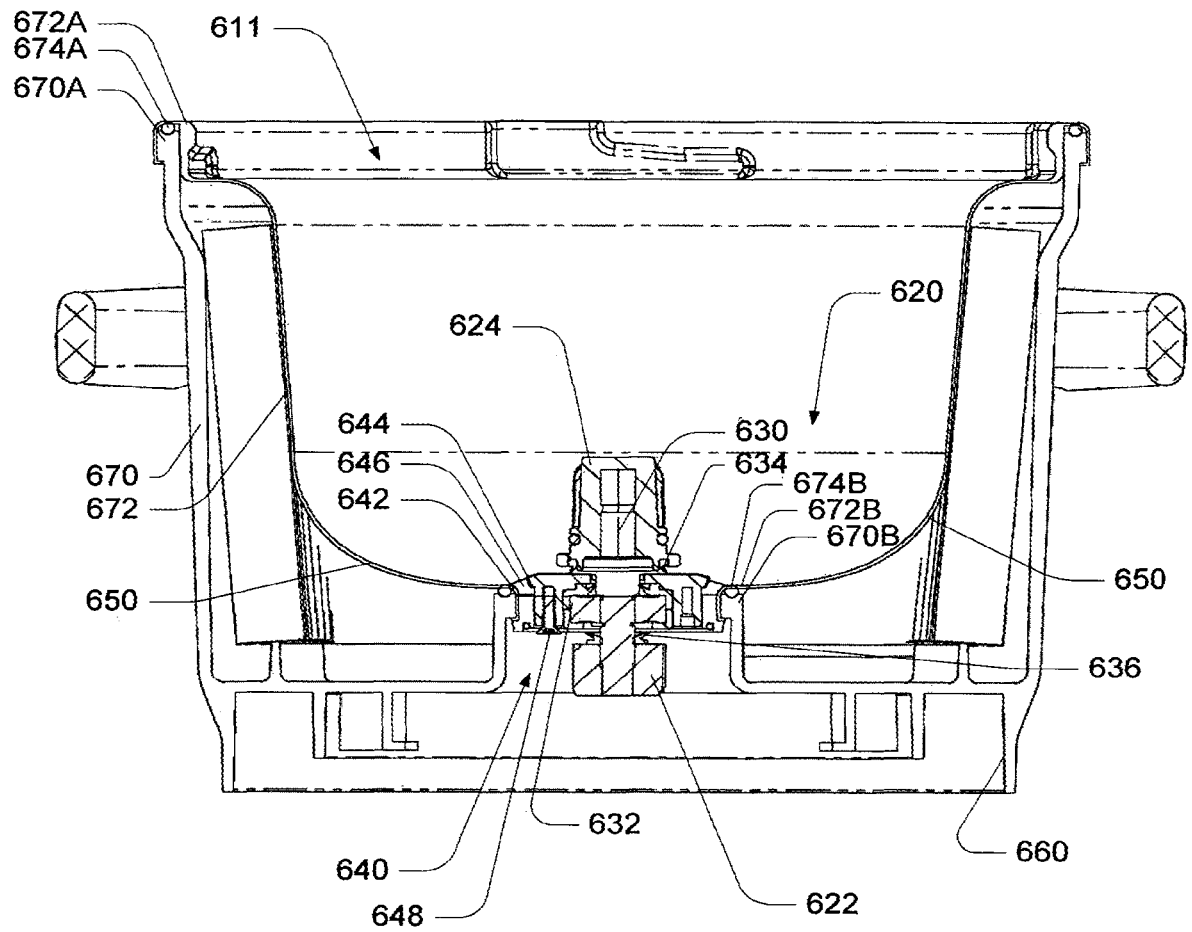
FIG. 6C is a sectional view of an embodiment freezer bowl for use with for use with a switched reluctance motor (SRM) motor application, having a substantially hemisphere bowl section.

FIG. 6C shows an alternative bowl 611 that defines a fluid receiving vessel that defines a lower surface 650 of the ice-cream fluid mixture receiving reservoir as being bowl shaped or hemispherical.

To provide additional room for the lower driven coupling, the bowl can define a rim (or skirt) section 660 for abutting engagement of (and/or locating) the bowl on the base.

It will be appreciated that an inner-surface formation, an outer surface formation, heat sink and coolant, gel can be constructed according to any one or more of the examples disclosed herein.

FIG. 6A through FIG. 6C show, by way of example only, the freezer bowl 610 has an outer-surface formation 670, and. an inner surface formation 672. O-rings 674A, 674B are used to sealing the join between the outer-surface formation 670 and the inner surface formation 672. The o-rings are used to seal the void between the outer-surface formation 670 and the inner-surface formation 672 for retaining the heatsink. and/or fluid gel. By way of example, o-rings are captured between the freezer bowl moulding 670 and inner pressed portion 672.

In this embodiment, the outer freezer bowl moulding 670 has a raised outer perimeter 670A and a raised inner aperture 670B. The inner pressed portion 672 further has a raised outer perimeter 672A and a raised inner aperture 672B. The larger o-ring 674A is located between the raised, outer perimeters 670A and 672A, The smaller o-ring 674B is located between the raised outer apertures 670B and 672B. It would be appreciated, a bonding agent such as a room temperature vulcanizing silicone could also be used as an alternative to using an o-ring.

Figure 7A:
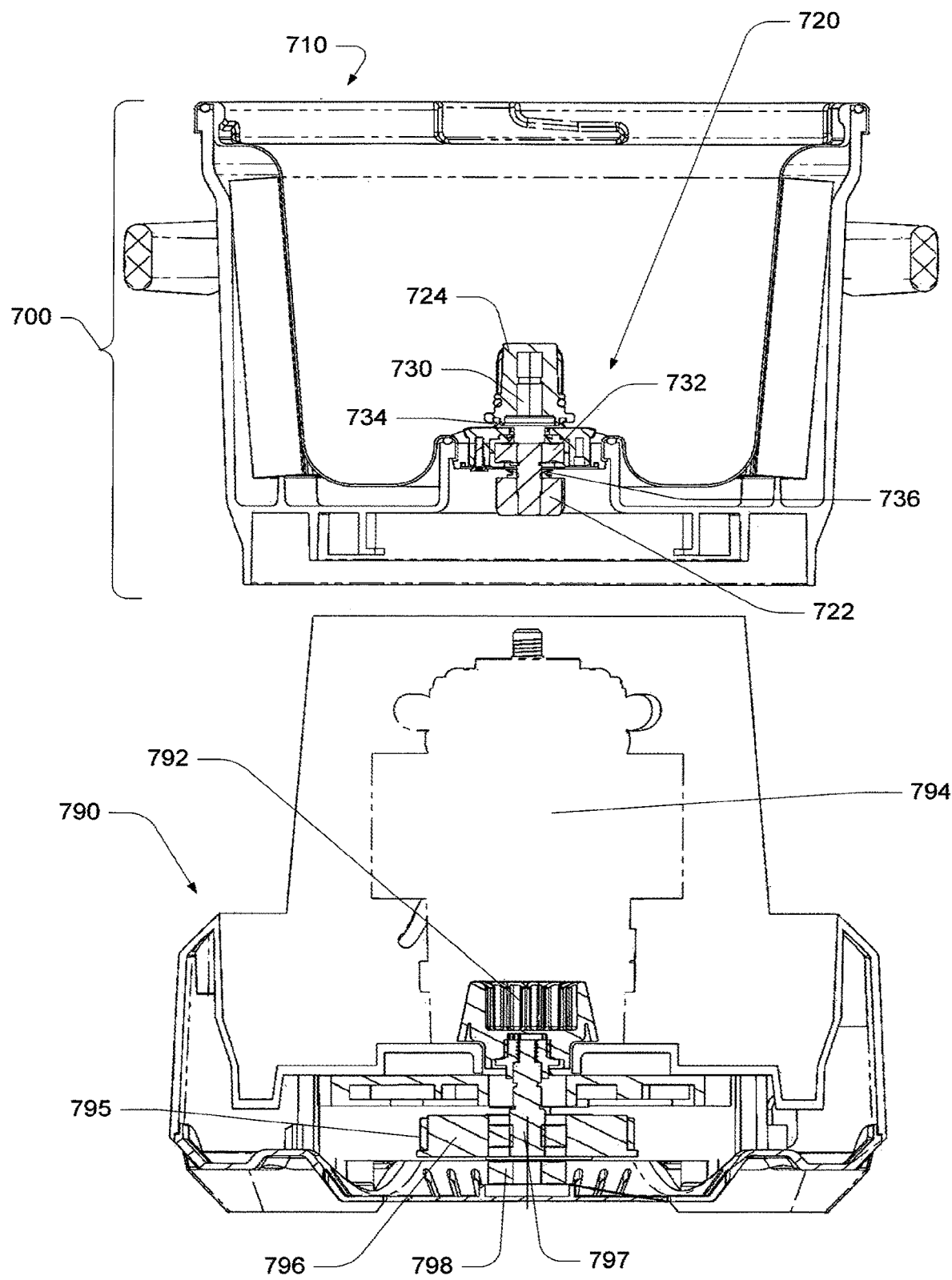
FIG. 7A. is a sectional view of an embodiment ice cream accessory assembly for a base driven universal motor appliance.
Figure 7B:
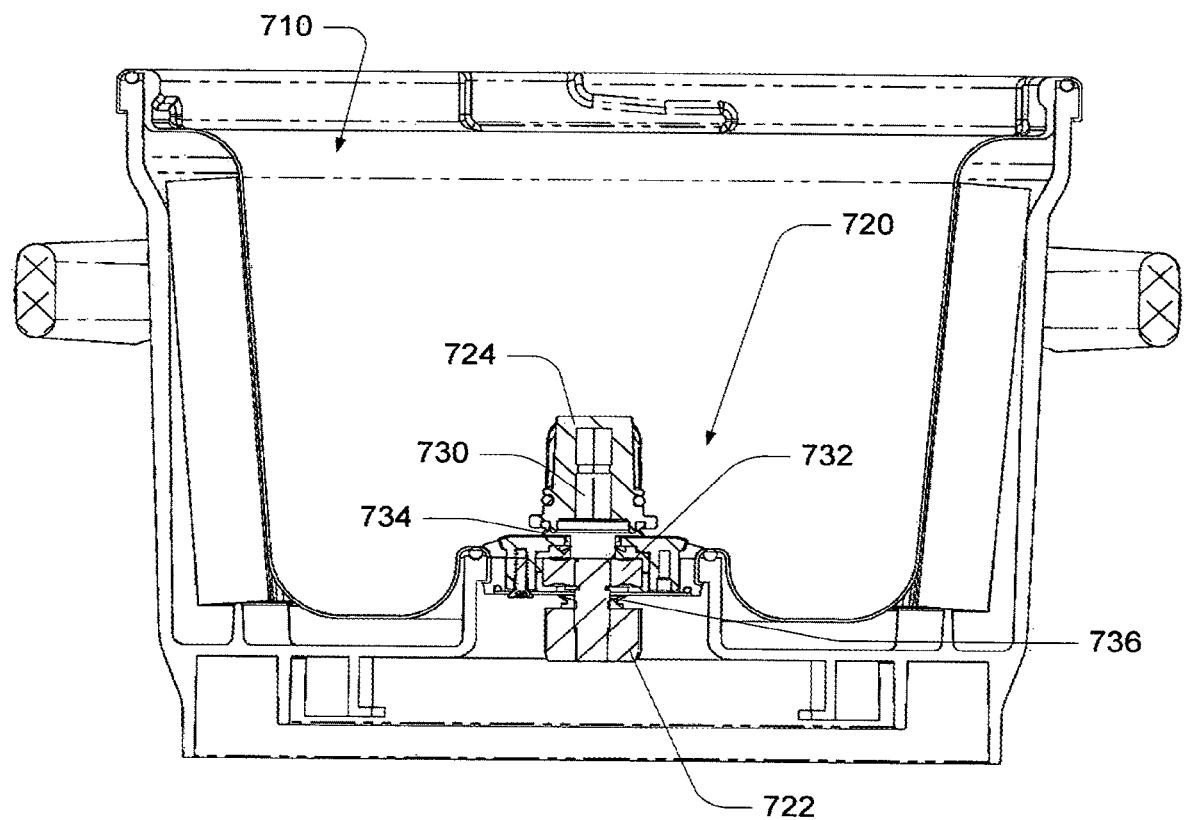
FIG. 7B is a sectional view of an embodiment freezer bowl for use with a universal motor application.

FIG. 7A shows an embodiment ice cream accessory assembly 700 for a base driven universal motor appliance 790. The ice cream making assembly is supported by and/or cooperates with the base.

In this example embodiment, the ice cream making assembly 700, includes a dual wall freezer bowl 710 for cooling foods therein. A paddle (not shown) is driven to rotate within the freezer bowl 710 by the base.

The appliance 790 has a primary drive coupling 792 driven by a universal motor or direct current motor 794. In this embodiment the motor 794 is located adjacent the drive coupling 792, and provides drive to the drive coupling 792 though a belt drive assembly including a belt 795 and drive spindle 796 coupled to a spindle shaft 797. The spindle shaft is typically supported by one or more spindle bearings 798.

In this embodiment, a central coupling assembly 720 comprising a driven coupling element 722 and a. secondary drive coupling element 724. The driven coupling element 722 engages the primary drive coupling 792 to then drive rotation of the secondary drive coupling element 724— thereby transferring rotational torque to the paddle.

In this example, a central shaft 730 is supported by one or more bearings 732 and sealed with an upper seal 734 and lower seal 736. The driven coupling element 722 and the secondary drive coupling element 724 are fixed to respective ends of the shaft 730.

it will be appreciated that an inner-surface formation, an outer surface formation, heat sink and coolant, gel can. be constructed according to any one or more of the examples disclosed herein.

Figure 8:
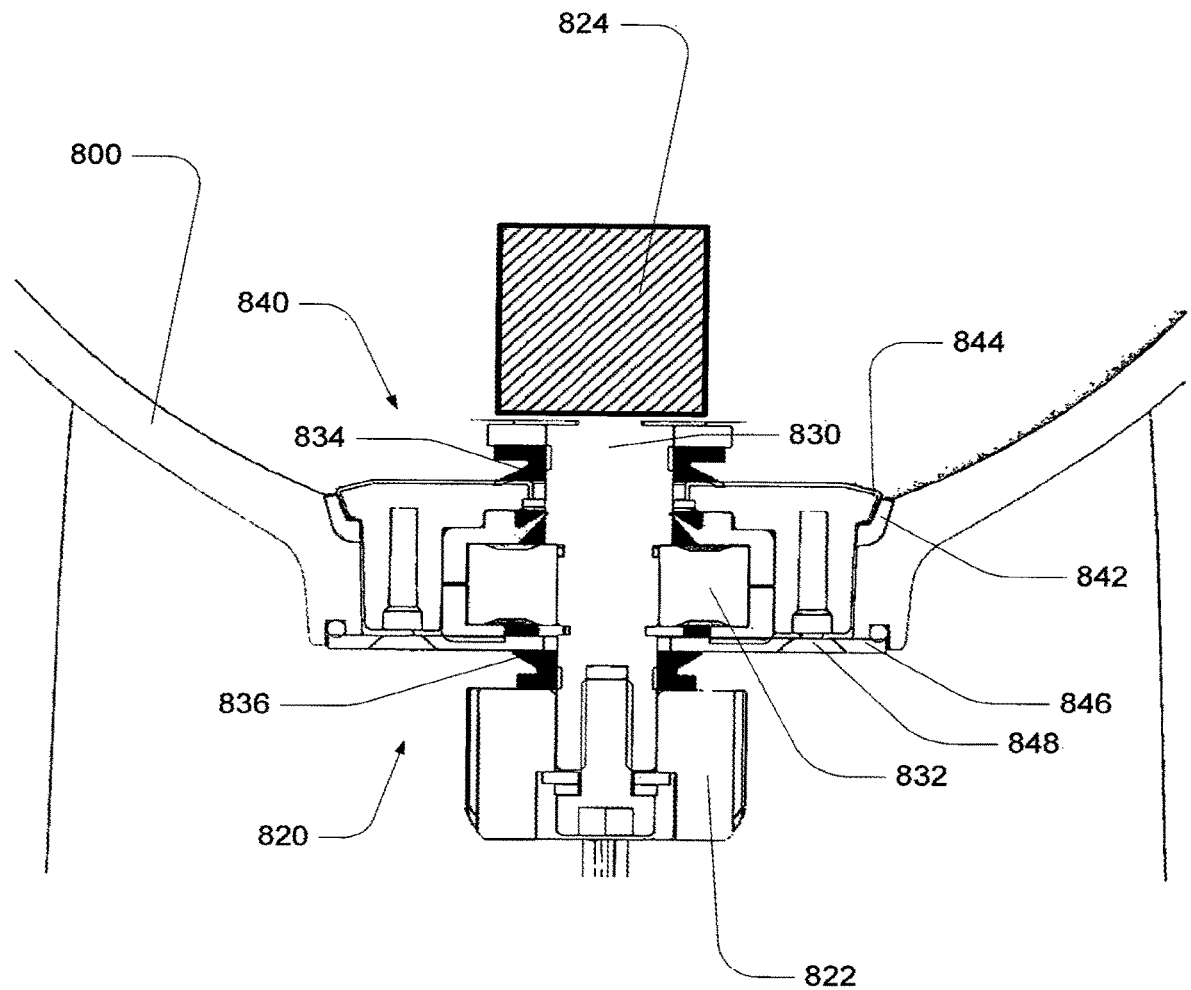
FIG. 8 is a sectional view of an embodiment, coupling assembly for coupling a bowl to a blender base appliance.

FIG. 8 shows a bowl 800 with a central coupling assembly 820 comprising a driven coupling element 822 and a secondary drive coupling element 824. The driven coupling element 822 engages the primary drive coupling (not shown) to then drive rotation of the secondary drive coupling element 824—and thereby transferring rotational torque to the paddle (not shown).

In this example, a central shaft 830 is supported by one or more bearings 832 and sealed with an upper seal 834 and lower seal 836. The driven coupling element 822 and the secondary drive coupling element 824 are fixed to respective ends of the shaft 830.

The bowl 800 defines a central aperture 840 for receiving the central coupling assembly 820. The aperture 840 has a circumferential chamfered surface 842 for sealing engagement with a corresponding abutment surface 844 of the central coupling assembly 820. In this embodiment the bowl is clamped between the central coupling assembly 820 and a fixing plate 846 (for example by screwed coupling 848 there between).

Figure 9:
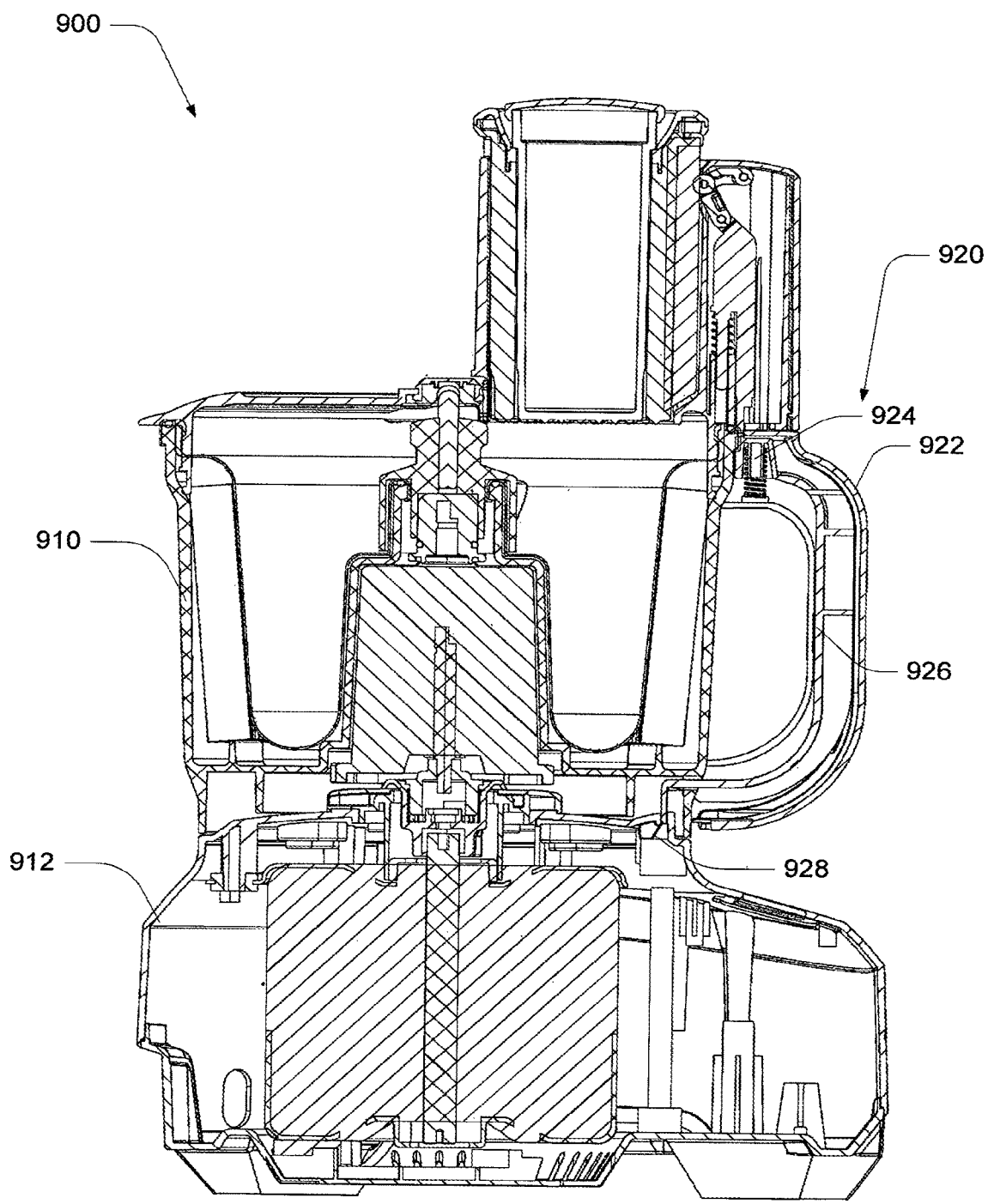
FIG. 9 is a sectional view of an embodiment coupling assembly for coupling a bowl to a food processor appliance.

FIG. 9 shows a sectional view of an embodiment 900 having coupling assembly for coupling a freezer bowl 910 to a food processor like appliance 912.

In this alternative configuration, an interlock assembly 920 is combined the bowl assembly. In this example, the interlock assembly 920 is at least partially contained within a handle 922. This improves safe operation of the apparatus, whereby the ice-cream paddle can only be activated when the lid and pusher are in position.

By way of example, the interlock assembly 920 includes a first mechanical element 924 that responds to (or is movable by) the lid being installed and the pusher inserted, which acts on a link element 926 located within the handle 922, to activate a switch or sensor 928.

Lid interlock assemblies were described in PCT patent application PCT/AU2011/001587, and published under international publication No. WO 2012/075525 on 14 Jun. 2012. International patent publication No. WO 2012/07.5525 is herein incorporated by reference in its entirety, for teaching of embodiment lid bowl interlock assemblies and food processor bases.

It will be appreciated that this safety interlock assembly can be incorporated with any bowl and lid assembly described herein.

It will be appreciated that the ice-cream bowl can be the dual wall ice-cream bowl assembly as described herein, it will be further appreciated that the lid assembly could be shared between a food processing bowl and the ice-cream bowl.

it will be appreciated that a processor module can be coupled to the motor, sensors and/or switches for controlling activation of the paddle, timing of the paddle, or monitoring hardness or temperature of the ice-cream.

It will, be appreciated that an inner-surface formation, an outer surface formation, heat sink and coolant gel can be constructed according to any one or more of the examples disclosed herein.

It will be appreciated that a coupling element can be, by way of example, a male coupling element or a female coupling element. The coupling element may be selected arbitrarily, or based on the appliance or availability of parts—provided mating coupling elements are selected for each drive coupling element and corresponding driven coupling element.

It will be appreciated that an illustrated embodiment discloses an ice cream making attachment for a base driven appliance.

It will be appreciated that the disclosed embodiments can provide one or more of the following advantages:
Provides an accessory function for chilling or cooling foods and liquids to a base driven food processing devices;
Provides a scraping action that can allow ingredients to cool gradually to a finer consistency;
Provides a dual-walled gel-filled freezer bowl to new food processors devices having a base drive coupling;
Provides a dual-wall gel-filled freezer bowl with an inner aperture—for a base driven paddle;
Provides a dual-wall gel-filled freezer bowl having an additional sealing arrangement between the inner and outer bowl walls—wherein sealing of the inner aperture prevents release of freezer gel and ingress of ingredient into the dual wall cavity;

Provides a dual-wall gel-filled freezer bowl with an inner aperture—that is open for allowing access to a removable drive-coupling, which is sealed with the drive coupling when assembled and sealed to the freezer bowl;

Provides a freezer bowl with a hinged inner lid for allowing user access to add ingredients while the unit is in operation—which is possible due to the relatively low rotation speed of the paddle;

Provides a freezer bowl with a clutch arrangement for disengaging drive to the paddle above a predetermined torque—thereby reducing the risk of injury to the user;

Provides a freezer bowl 'with a torque detection mechanism (for example monitoring drive motor current) for disengaging drive to the paddle above a predetermined torque—thereby reducing the risk; of injury to the user;

Provides a freezer bowl with a lid that includes a base interlock mechanism, which can further enable a single lid component to be used across varying processing bowls that each use the same interlock arrangement to activate the device;

Removes the need to created Sorbet by adding ice cubes or cold foods to the processing bowl, then chopping the ingredients at high speed-reducing potentially of introducing heat to the ingredients and/or damaging processing blades.

Although the invention has been described with reference to specific examples, it will be appreciated by those skilled in the art that the invention may be embodied in many other forms.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections-only. The terms "coupled" and "connected", along with their derivatives, ma be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but. yet still co-operate or interact with, each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining, the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than ail features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, an element described 'herein of an apparatus embodiment is an example of a means for carrying out the function performed by the element for the purpose of carrying out the invention, hi the description provided herein, numerous specific details are set forth. However, it is understood that embodiments of the invention may be practiced without these specific details. In other Instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim ail. such, changes and modifications as fall within the scope of the invention. For example, any formulas given above are merely representative of procedures that may be used.

Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The invention claimed is:

1. An ice-cream making assembly for use with a base driven appliance, the base driven appliance having a rotatable drive coupling, the ice-cream making assembly comprising:
    a freezer bowl arranged to cool foods therein, the freezer bowl having an upwardly extending central sleeve defining a lower recess, the lower recess having a centrally located aperture, the central sleeve extending upwardly past a fill height;
    a rotatable paddle located within the freezer bowl and having a paddle coupling;
    a gear assembly disposed within the lower recess, the gear assembly including a lower drive coupling sized to engage the drive coupling of the base driven appliance, the gear assembly having an upper drive coupling engaging the paddle coupling through the centrally located aperture when the rotatable paddle is mounted in the freezer bowl, the gear assembly arranged such that the upper drive coupling and the paddle rotate in response to rotation of the lower drive coupling;
    a lid for covering the freezer bowl; and
    wherein the freezer bowl has an inner-surface formation and an outer-surface formation, the inner-surface formation comprising a seamless surface that is wrapped over an upper edge of an outer wall of the freezer bowl and the central sleeve, and the inner-surface formation and the outer-surface formation defining a sealed intermediate void region, and
    wherein the ice-cream making assembly is removable from the base with the gear assembly still disposed within the lower recess of the central sleeve of the freezer bowl.

2. The ice-cream making assembly of claim 1, further including a gear locator engaging the lower recess of the central sleeve and the gear assembly and arranged to resist relative rotation between the freezer bowl and the gear assembly.

3. The ice-cream making assembly of claim 1, wherein the paddle includes a paddle shaft and further including a clutch assembly coupled to the paddle shaft and configured to restrict torque applied between the paddle and the gear assembly.

4. The ice-cream making assembly of claim 1, further including a heat sink located in the sealed intermediate void region between the inner-surface formation and the outer-surface formation.

5. The ice-cream making assembly of claim 1, further including a coolant gel located in the sealed intermediate void region between the inner-surface formation and the outer-surface formation.

6. The ice-cream making assembly of claim 1, further including o-rings sealingly connecting the inner-surface formation and the outer-surface formation.

7. The ice-cream making assembly of claim 1, further including a bonding agent sealingly connecting the inner-surface formation and the outer-surface formation, the bonding agent being a room temperature vulcanizing silicone.

8. The ice-cream making assembly of claim 1, wherein the freezer bowl has a bayonet coupling engaging a lid bayonet coupling for releasably retaining the lid on the freezer bowl.

9. The ice-cream making assembly of claim 1, wherein the gear assembly is arranged so that rotation of the lower drive coupling at a first rotational speed rotates the upper drive coupling at a second rotational speed less than the first rotational speed.

* * * * *